(12) United States Patent
Shpunt et al.

(10) Patent No.: US 8,374,397 B2
(45) Date of Patent: Feb. 12, 2013

(54) DEPTH-VARYING LIGHT FIELDS FOR THREE DIMENSIONAL SENSING

(75) Inventors: Alexander Shpunt, Tel Aviv (IL); Zeev Zalevsky, Rosh HaAyin (IL)

(73) Assignee: Primesense Ltd, Tel Aviv (IL)

( * ) Notice: Subject to any disclaimer, the term of this patent is extended or adjusted under 35 U.S.C. 154(b) by 0 days.

(21) Appl. No.: 13/043,488

(22) Filed: Mar. 9, 2011

(65) Prior Publication Data

US 2011/0158508 A1    Jun. 30, 2011

Related U.S. Application Data

(60) Division of application No. 11/724,068, filed on Mar. 13, 2007, now Pat. No. 8,050,461, which is a continuation-in-part of application No. PCT/IL2006/000335, filed on Mar. 14, 2006.

(60) Provisional application No. 60/785,187, filed on Mar. 24, 2006, provisional application No. 60/852,436, filed on Oct. 16, 2006, provisional application No. 60/724,903, filed on Oct. 11, 2005.

(51) Int. Cl.
| | |
|---|---|
| *G06K 9/00* | (2006.01) |
| *G06T 15/00* | (2006.01) |
| *G01C 3/14* | (2006.01) |
| *G01B 11/24* | (2006.01) |
| *G01B 11/30* | (2006.01) |

(52) U.S. Cl. ......... 382/106; 382/154; 345/419; 356/610
(58) Field of Classification Search .................. 382/154, 382/285; 345/419–427; 356/12–14; 348/42–60; 359/462–477; 352/57–65; 33/20.4; 353/7–9; 378/41–42; 396/324–331
See application file for complete search history.

(56) References Cited

U.S. PATENT DOCUMENTS

| | | |
|---|---|---|
| 4,336,978 A | 6/1982 | Suzuki |
| 4,542,376 A | 9/1985 | Bass et al. |
| 4,802,759 A | 2/1989 | Matsumoto et al. |
| 4,843,568 A | 6/1989 | Krueger et al. |
| 5,075,562 A | 12/1991 | Greivenkamp et al. |
| 5,483,261 A | 1/1996 | Yasutake |
| 5,630,043 A | 5/1997 | Uhlin |
| 5,636,025 A | 6/1997 | Bieman et al. |
| 5,712,682 A | 1/1998 | Hannah |
| 5,835,218 A | 11/1998 | Harding |
| 5,838,428 A | 11/1998 | Pipitone et al. |
| 5,856,871 A | 1/1999 | Cabib et al. |
| 5,909,312 A | 6/1999 | Mendlovic et al. |

(Continued)

FOREIGN PATENT DOCUMENTS

| | | |
|---|---|---|
| DE | 19736169 A1 | 8/1997 |
| DE | 19638727 A1 | 3/1998 |

(Continued)

OTHER PUBLICATIONS

Abramson, N., "Holographic Contouring by Translation", Applied Optics Journal, vol. 15, No. 4, pp. 1018-1976, Apr. 1976.

(Continued)

*Primary Examiner* — Aaron W Carter
(74) *Attorney, Agent, or Firm* — D.Kligler I.P. Services Ltd

(57) ABSTRACT

A method for mapping includes projecting onto an object a pattern of multiple spots having respective positions and shapes, such that the positions of the spots in the pattern are uncorrelated, while the shapes share a common characteristic. An image of the spots on the object is captured and processed so as to derive a three-dimensional (3D) map of the object.

22 Claims, 6 Drawing Sheets

U.S. PATENT DOCUMENTS

| | | | |
|---|---|---|---|
| 6,041,140 A * | 3/2000 | Binns et al. ............... | 382/209 |
| 6,081,269 A | 6/2000 | Quarendon | |
| 6,084,712 A | 7/2000 | Harding | |
| 6,088,105 A | 7/2000 | Link | |
| 6,099,134 A | 8/2000 | Taniguchi et al. | |
| 6,100,517 A | 8/2000 | Yahav et al. | |
| 6,101,269 A | 8/2000 | Hunter et al. | |
| 6,108,036 A | 8/2000 | Harada et al. | |
| 6,167,151 A | 12/2000 | Albeck | |
| 6,259,561 B1 | 7/2001 | George et al. | |
| 6,262,740 B1 | 7/2001 | Lauer et al. | |
| 6,268,923 B1 | 7/2001 | Michniewicz et al. | |
| 6,301,059 B1 | 10/2001 | Huang et al. | |
| 6,438,263 B2 | 8/2002 | Albeck et al. | |
| 6,494,837 B2 | 12/2002 | Kim et al. | |
| 6,495,848 B1 * | 12/2002 | Rubbert ............... | 250/559.22 |
| 6,686,921 B1 | 2/2004 | Rushmeier et al. | |
| 6,731,391 B1 | 5/2004 | Kao et al. | |
| 6,741,251 B2 | 5/2004 | Malzbender | |
| 6,750,906 B1 | 6/2004 | Itani et al. | |
| 6,751,344 B1 | 6/2004 | Grumbine | |
| 6,754,370 B1 | 6/2004 | Hall-Holt et al. | |
| 6,803,777 B2 | 10/2004 | Pfaff et al. | |
| 6,810,135 B1 | 10/2004 | Berenz et al. | |
| 6,813,440 B1 | 11/2004 | Yu et al. | |
| 6,825,985 B2 | 11/2004 | Brown et al. | |
| 6,841,780 B2 | 1/2005 | Cofer et al. | |
| 6,859,326 B2 | 2/2005 | Sales | |
| 6,937,348 B2 | 8/2005 | Geng | |
| 7,006,952 B1 * | 2/2006 | Matsumoto et al. .......... | 703/2 |
| 7,009,742 B2 | 3/2006 | Brotherton-Ratcliffe et al. | |
| 7,013,040 B2 | 3/2006 | Shiratani | |
| 7,076,024 B2 | 7/2006 | Yokhin | |
| 7,112,774 B2 | 9/2006 | Baer | |
| 7,120,228 B2 | 10/2006 | Yokhin et al. | |
| 7,127,101 B2 | 10/2006 | Littlefield et al. | |
| 7,194,105 B2 | 3/2007 | Hersch et al. | |
| 7,256,899 B1 | 8/2007 | Faul et al. | |
| 7,335,898 B2 | 2/2008 | Donders et al. | |
| 7,369,685 B2 | 5/2008 | DeLean | |
| 7,385,708 B2 | 6/2008 | Ackerman et al. | |
| 7,433,024 B2 | 10/2008 | Garcia et al. | |
| 7,551,719 B2 | 6/2009 | Yokhin et al. | |
| 7,659,995 B2 | 2/2010 | Knighton et al. | |
| 7,700,904 B2 | 4/2010 | Toyoda et al. | |
| 7,751,063 B2 | 7/2010 | Dillon et al. | |
| 7,840,031 B2 | 11/2010 | Albertson et al. | |
| 8,050,461 B2 * | 11/2011 | Shpunt et al. ............... | 382/106 |
| 2001/0016063 A1 * | 8/2001 | Albeck et al. ............... | 382/154 |
| 2002/0041327 A1 * | 4/2002 | Hildreth et al. ............. | 348/42 |
| 2002/0075456 A1 | 6/2002 | Shiratani | |
| 2003/0048237 A1 | 3/2003 | Sato et al. | |
| 2003/0057972 A1 | 3/2003 | Pfaff et al. | |
| 2003/0156756 A1 | 8/2003 | Gokturk et al. | |
| 2004/0105580 A1 | 6/2004 | Hager et al. | |
| 2004/0130730 A1 | 7/2004 | Cantin et al. | |
| 2004/0130790 A1 | 7/2004 | Sales | |
| 2004/0174770 A1 | 9/2004 | Rees | |
| 2004/0213463 A1 | 10/2004 | Morrison | |
| 2004/0218262 A1 | 11/2004 | Chuang et al. | |
| 2004/0228519 A1 | 11/2004 | Littlefield et al. | |
| 2005/0052637 A1 | 3/2005 | Shaw et al. | |
| 2005/0111705 A1 | 5/2005 | Waupotitsch et al. | |
| 2005/0200838 A1 | 9/2005 | Shaw et al. | |
| 2005/0200925 A1 | 9/2005 | Brotherton-Ratcliffe et al. | |
| 2005/0231465 A1 * | 10/2005 | DePue et al. .............. | 345/156 |
| 2005/0271279 A1 | 12/2005 | Fujimura et al. | |
| 2006/0017656 A1 | 1/2006 | Miyahara | |
| 2006/0072851 A1 | 4/2006 | Kang et al. | |
| 2006/0156756 A1 | 7/2006 | Becke | |
| 2006/0221218 A1 | 10/2006 | Adler et al. | |
| 2007/0057946 A1 | 3/2007 | Albeck et al. | |
| 2007/0060336 A1 | 3/2007 | Marks et al. | |
| 2007/0165243 A1 * | 7/2007 | Kang et al. ............... | 356/603 |
| 2008/0018595 A1 | 1/2008 | Hildreth et al. | |
| 2008/0031513 A1 * | 2/2008 | Hart ............... | 382/154 |
| 2008/0106746 A1 | 5/2008 | Shpunt et al. | |
| 2008/0198355 A1 | 8/2008 | Domenicali et al. | |
| 2008/0212835 A1 | 9/2008 | Tavor | |
| 2008/0240502 A1 | 10/2008 | Freedman et al. | |
| 2008/0247670 A1 | 10/2008 | Tam et al. | |
| 2009/0016642 A1 * | 1/2009 | Hart ............... | 382/278 |
| 2009/0096783 A1 | 4/2009 | Shpunt et al. | |
| 2009/0183125 A1 | 7/2009 | Magal et al. | |
| 2009/0183152 A1 | 7/2009 | Yang et al. | |
| 2009/0185274 A1 | 7/2009 | Shpunt | |
| 2010/0007717 A1 | 1/2010 | Spektor et al. | |
| 2010/0013860 A1 | 1/2010 | Mandella et al. | |
| 2010/0020078 A1 | 1/2010 | Shpunt | |
| 2010/0118123 A1 | 5/2010 | Freedman et al. | |
| 2010/0128221 A1 | 5/2010 | Muller et al. | |
| 2010/0177164 A1 | 7/2010 | Zalevsky et al. | |
| 2010/0194745 A1 * | 8/2010 | Leister et al. ............. | 345/419 |
| 2010/0201811 A1 | 8/2010 | Garcia et al. | |
| 2010/0225746 A1 | 9/2010 | Shpunt et al. | |
| 2010/0265316 A1 | 10/2010 | Sali et al. | |
| 2010/0284082 A1 | 11/2010 | Shpunt et al. | |
| 2010/0290698 A1 | 11/2010 | Shpunt et al. | |
| 2010/0303289 A1 | 12/2010 | Polzin et al. | |
| 2011/0025827 A1 | 2/2011 | Shpunt et al. | |
| 2011/0074932 A1 | 3/2011 | Gharib et al. | |
| 2011/0096182 A1 | 4/2011 | Cohen et al. | |
| 2011/0134114 A1 | 6/2011 | Rais et al. | |
| 2011/0187878 A1 | 8/2011 | Mor et al. | |
| 2011/0188054 A1 | 8/2011 | Mor et al. | |
| 2011/0211044 A1 | 9/2011 | Shpunt et al. | |

FOREIGN PATENT DOCUMENTS

| | | |
|---|---|---|
| GB | 2352901 A | 2/2001 |
| JP | 62206684 A | 9/1987 |
| JP | 01-240863 | 9/1989 |
| JP | 03-029806 U | 2/1991 |
| JP | H03-040591 A | 2/1991 |
| JP | 06-273432 | 9/1994 |
| JP | H08-186845 A | 7/1996 |
| JP | H10-327433 A | 12/1998 |
| JP | 2001141430 A | 5/2001 |
| JP | 2002122417 | 4/2002 |
| JP | 2002-152776 A | 5/2002 |
| JP | 2002-213931 A | 7/2002 |
| JP | 2002-365023 A | 12/2002 |
| JP | 2006-128818 A | 5/2006 |
| WO | 9303579 A1 | 2/1993 |
| WO | 9827514 A2 | 6/1998 |
| WO | 9828593 A1 | 7/1998 |
| WO | 9828593 A2 | 7/1998 |
| WO | 2005010825 A2 | 2/2005 |

OTHER PUBLICATIONS

Achan et al., "Phase Unwrapping by Minimizing Kikuchi Free Energy", IEEE International Geoscience and Remote Sensing Symposium, pp. 1738-1740, Toronto, Canada, Jun. 2002.

Theocaris et al., "Radial Gratings as Moire Gauges", Journal of Scientific Instruments (Journal of Physics E), series 2, vol. 1, year 1968.

International Application PCT/IB2011/053560 "Scanning Projectors and Image Capture Modules for 3D Mapping" filed on Aug. 10, 2011.

International Application PCT/IL2009/000285 Search Report dated Jun. 11, 2009.

Brooks et al., "Moire Gauging Using Optical Interference Patterns", Applied Optics Journal, vol. 8, No. 5, pp. 935-940, May 1969.

Hovanesian et al., "Moire Contour-Sum Contour-Difference, and Vibration Analysis of Arbitrary Objects", Applied Optics Journal, vol. 10, No. 12, pp. 2734-2738, Dec. 1971.

Bryngdahl, O., "Characteristics of Superposed Patterns in Optics", Journal of Optical Society of America, vol. 66, No. 2, pp. 87-94, Feb. 1976.

International Application PCT/IL2008/000095 Search Report dated Jul. 24, 2008.

Chen et al., "Overview of Three-Dimensional Shape Measurement Using Optical Methods", Society of Photo-Optical Instrumentation Engineers Journal 39(1), pp. 10-22, Jan. 2000.

Cohen et al., "High-Resolution X-ray Diffraction for Characterization and Monitoring of Silicon-On-Insulator Fabrication Processes", Applied Physics Journal, vol. 93, No. 1, pp. 245-250, Jan. 2003.

Zhang et al., "Shape from intensity gradient", IEEE Transactions on Systems, Man and Cybernetics—Part A: Systems and Humans, vol. 29, No. 3, pp. 318-325, May 1999.

Doty, J.L., "Projection Moire for Remote Contour Analysis", Journal of Optical Society of America, vol. 73, No. 3, pp. 366-372, Mar. 1983.

Ben Eliezer et al., "Experimental Realization of an Imaging System with an Extended Depth of Field", Applied Optics Journal, vol. 44, No. 14, pp. 2792-2798, May 10, 2005.

Tay et al., "Grating Projection System for Surface Contour Measurement", Applied Optics Journal, vol. 44, No. 8, pp. 1393-1400, Mar. 10, 2005.

Takeda et al., "Fourier Transform Methods of Fringe-Pattern Analysis for Computer-Based Topography and Interferometry", Journal of Optical Society of America, vol. 72, No. 1, Jan. 1982.

Takasaki, H., "Moire Topography", Applied Optics Journal, vol. 12, No. 4, pp. 845-850, Apr. 1973.

Takasaki, H., "Moire Topography", Applied Optics Journal, vol. 9, No. 6, pp. 1467-1472, Jun. 1970.

Hildebrand et al., "Multiple-Wavelength and Multiple-Source Holography Applied to Contour Generation", Journal of Optical Society of America Journal, vol. 57, No. 2, pp. 155-162, Feb. 1967.

Su et al., "Application of Modulation Measurement Profilometry to Objects with Surface Holes", Applied Optics Journal, vol. 38, No. 7, pp. 1153-1158, Mar. 1, 1999.

Btendo, "Two Uni-axial Scanning Mirrors Vs One Bi-axial Scanning Mirror", Kfar Saba, Israel, Aug. 13, 2008.

Hung et al., "Time-Averaged Shadow-Moire Method for Studying Vibrations", Applied Optics Journal, vol. 16, No. 6, pp. 1717-1719, Jun. 1977.

Idesawa et al., "Scanning Moire Method and Automatic Measurement of 3-D Shapes", Applied Optics Journal, vol. 16, No. 8, pp. 2152-2162, Aug. 1977.

Iizuka, K., "Divergence-Ratio Axi-Vision Camera (Divcam): A Distance Mapping Camera", Review of Scientific Instruments 77, 0451111 (2006).

Lim et al., "Additive Type Moire with Computer Image Processing", Applied Optics Journal, vol. 28, No. 13, pp. 2677-2680, Jul. 1, 1989.

Piestun et al., "Wave Fields in Three Dimensions: Analysis and Synthesis", Journal of the Optical Society of America, vol. 13, No. 9, pp. 1837-1848, Sep. 1996.

Post et al., "Moire Methods for Engineering and Science—Moire Interferometry and Shadow Moire", Photomechanics (Topics in Applied Physics), vol. 77, pp. 151-196, Springer Berlin / Heidelberg, Jan. 1, 2000.

Chinese Patent Application # 200780006560.6 Official Action dated Oct. 11, 2010.

International Application PCT/IB2010/053430 Search Report dated Dec. 28, 2010.

Scharstein et al., "High-Accuracy Stereo Depth Maps Using Structured Light", IEEE Proceedings of the Conference on Computer Vision and Pattern Recognition, pp. 165-171, Jun. 18, 2003.

Koschan et al., "Dense Depth Maps by Active Color Illumination and Image Pyramids", Advances in Computer Vision, pp. 137-148, Springer 1997.

Marcia et al., "Fast Disambiguation of Superimposed Images for Increased Field of View", IEEE International Conference on Image Processing, San Diego, USA, Oct. 12-15, 2008.

Microvision Inc., "Micro-Electro-Mechanical System (MEMS) Scanning Mirror", years 1996-2009.

U.S. Appl. No. 61/419,891 "Lens Arrays for Pattern Projection and Imaging" filed Dec. 6, 2010.

U.S. Appl. No. 61/415,352 "Depth mapping using time-coded illumination" filed Nov. 19, 2010.

Lavoie et al., "3-D Object Model Recovery From 2-D Images Using Structured Light", IEEE Transactions on Instrumentation and Measurement, vol. 53, No. 2, pp. 437-443, Apr. 2004.

Chinese Application # 200780016625.5 Office Action dated May 12, 2011.

U.S. Appl. No. 11/899,542 Office Action dated Apr. 4, 2011.

U.S. Appl. No. 11/724,068 Office Action dated Mar. 1, 2011.

Chinese Application # 200780009053.8 Office Action dated Mar. 10, 2011.

Japanese Application # 2008535179 Office Action dated Apr. 1, 2011.

Kun et al., "Gaussian Laser Beam Spatial Distribution Measurement by Speckles Displacement Method", HICH Power Laser and Particle Beams, vol. 12, No. 2, Apr. 2000.

Chinese Patent Application # 200680038004.2 Official Action dated Dec. 24, 2010.

Chinese Patent Application # 200780016625.5 Official Action dated Oct. 26, 2010.

Chinese Patent Application # 200780006560.6 Official Action dated Feb. 1, 2011.

International Application No. PCT/IB2010/053430 Search Report dated Dec. 28, 2010.

Yao Kun et al., "Measurement of Space Distribution of Laser Gaussian Beam by Speckles Displacement Method", High Power Laser and Particle Beams, vol. 12, No. 2, pp. 141-144, Apr. 30, 2000.

Hart, D., U.S. Appl. No. 09/616,606 "Method and System for High Resolution , Ultra Fast 3-D Imaging" filed Jul. 14, 2000.

International Application PCT/IL2007/000306 Search Report dated Oct. 2, 2008.

International Application PCT/IL20027/000262 Search Report dated Oct. 16, 2008.

International Application PCT/IL2008/000458 Search Report dated Oct. 28, 2008.

International Application PCT/IL2008/000327 Search Report dated Sep. 26, 2008.

International Application PCT/IL2006/000335 Preliminary Report on Patentability dated Apr. 24, 2008.

Sazbon et al., "Qualitative real-time range extraction for preplanned scene partitioning using laser beam coding", Pattern Recognition Letters 26, pp. 1772-1781, year 2005.

Sjodahl et al., "Measurement of shape by using projected random and patterns and temporal digital speckle photography", Applied Optics, vol. 38, No. 10, Apr. 1, 1999.

Garcia et al., "Three dimensional mapping and range measurement by means of projected speckle patterns", Applied Optics, vol. 47, No. 16, Jun. 1, 2008.

Chen et al., "Measuring of a Three-Dimensional Surface by Use of a Spatial Distance Computation", Applied Optics, vol. 42, issue 11, pp. 1958-1972, Apr. 10, 2003.

Ypsilos et al., "Speech-driven Face Synthesis from 3D Video", 2nd International Symposium on 3D Processing, Visualization and Transmission, Thessaloniki, Greece, Sep. 6-9, 2004.

Hanson et al., "Optics and Fluid Dynamics Department", Annual Progress Report for 1997 (an abstract).

Ypsilos et al., "Video-rate capture of Dynamic Face Shape and Appearance", Sixth IEEE International Conference on Automatic Face and Gesture Recognition (FGR 2004), Seoul, Korea, May 17-19, 2004.

Goodman, J.W., "Statistical Properties of Laser Speckle Patterns", Laser Speckle and Related Phenomena, pp. 9-75, Springer-Verlag, Berlin Heidelberg, 1975.

Dainty, J.C., "Introduction", Laser Speckle and Related Phenomena, pp. 1-7, Springer-Verlag, Berlin Heidelberg, 1975.

Avidan et al., "Trajectory triangulation: 3D reconstruction of moving points from amonocular image sequence", IEEE Transactions on Pattern Analysis and Machine Intelligence, vol. 22, No. 4, pages, Apr. 2000.

Leclerc et al., "The direct computation of height from shading", Proceedings of Computer Vision and Pattern Recognition, pp. 552-558, year 1991.

Zhang et al., "Height recovery from intensity gradients", Proceedings of IEEE Computer Society Conference on Computer Vision and Pattern Recognition, pp. 508-513, year 1994.

Zigelman et al., "Texture mapping using surface flattening via multi-dimensional scaling", IEEE Transactions on Visualization and Computer Graphics, 8 (2), pp. 198-207, year 2002.

Kimmel et al., Analyzing and synthesizing images by evolving curves with the Osher-Sethian method, International Journal of Computer Vision, 24(1), pp. 37-56 , year 1997.

Koninckx et al., "Efficient, Active 3D Acquisition, based on a Pattern-Specific Snake", Luc Van Gool (Editor), (DAGM 2002) Pattern Recognition, Lecture Notes in Computer Science 2449, pp. 557-565, Springer 2002.

Horn, B., "Height and gradient from shading", International Journal of Computer Vision, No. 5, pp. 37-76, year 1990.

Bruckstein, A., "On shape from shading", Computer Vision, Graphics, and Image Processing, vol. 44, pp. 139-154, year 1988.

Zhang et al., "Rapid Shape Acquisition Using Color Structured Light and Multi-Pass Dynamic Programming", 1st International Symposium on 3D Data Processing Visualization and Transmission (3DPVT), Padova, Italy, Jul. 2002.

Besl, P., "Active Optical Range Imaging Sensors", Machine Vision and Applications, No. 1, pp. 127-152, USA 1988.

Horn et al., "Toward optimal structured light patterns", Proceedings of International Conference on Recent Advances in 3D Digital Imaging and Modeling, pp. 28-37, Ottawa, Canada, May 1997.

Mendlovic, et al., "Composite harmonic filters for scale, projection and shift invariant pattern recognition", Applied Optics, vol. 34, No. 2, pp. 310-316, Jan. 10, 1995.

Asada et al., "Determining Surface Orientation by Projecting a Stripe Pattern", IEEE Transactions on Pattern Analysis and Machine Intelligence, vol. 10, No. 5, year 1988.

Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.

EZconn Czech a.S., "Site Presentation", Oct. 2009.

Zhu et al., "Fusion of Time-of-Flight Depth and Stereo for High Accuracy Depth Maps", Proceedings of the IEEE Conference on Computer Vision and Pattern Recognition, Anchorage, USA, Jun. 24-26, 2008.

Luxtera Inc., "Luxtera Announces World's First 10GBit CMOS Photonics Platform", Carlsbad, USA, Mar. 28, 2005 (press release).

Lee et al., "Variable Pulse Mode Driving IR Source Based 3D Robotic Camera", MVA2005 IAPR Conference on Machine Vision Applications, pp. 530-533, Japan, May 16-18, 2005.

Mordohai et al., "Tensor Voting: A Perceptual Organization Approach to Computer Vision and Machine Learning", Synthesis Lectures on Image, Video and Multimedia Processing, issue No. 8, Publishers Morgan and Claypool, year 2006.

Beraldin et al., "Active 3D Sensing", Scuola Normale Superiore Pisa, vol. 10, pp. 22-46, Apr. 2000.

Bhat et al., "Ordinal Measures for Image Correspondence", IEEE Transactions on Pattern Analysis and Machine Intelligence, vol. 20, No. 4, pp. 415-423, Apr. 1998.

Bradley et al., "Synchronization and Rolling Shutter Compensation for Consumer Video Camera Arrays", IEEE International Workshop on Projector-Camera Systems—PROCAMS 2009 (Miami Beach, Florida, 2009).

De Piero et al., "3D Computer Vision Using Structured Light: Design Calibration and Implementation Issues", Advances in Computers, vol. 43, pp. 243-278, Academic Press 1996.

Hongjun et al., "Shape Measurement by Digital Speckle Temporal Sequence Correlation Method", Acta Optica Sinica Journal, vol. 21, No. 10, pp. 1208-1213, Oct. 2001 (with English abstract).

Hongjun, D., "Digital Speckle Temporal Sequence Correlation Method and the Application in Three-Dimensional Shape Measurement", Chinese Doctoral Dissertations & Master's Theses, Full-text Database (Master) Basic Sciences, No. 1, Mar. 15, 2004.

Hsueh et al., "Real-time 3D Topography by Speckle Image Correlation", Proceedings of SPIE Conference on Input/Output and Imaging Technologies, vol. 3422, pp. 108-112, Taiwan, Jul. 1998.

Chinese Patent Application # 200780009053.8 Official Action dated Apr. 15, 2010 (English translation).

Chinese Patent Application # 200680038004.2 Official Action dated Mar. 30, 2010 (English translation).

Chinese Patent Application # 200680038004.2 Official Action dated Aug. 3, 2011 (English translation).

Engfield, N., "Use of Pseudorandom Encoded Grid in U.S. Appl. No. 11/899,542", Andrews Robichaud, filed Jun. 22, 2011.

U.S. Appl. No. 61/471,215, filed Apr. 4, 2011.

U.S. Appl. No. 12/522,171 Official Action dated Apr. 5, 2012.

U.S. Appl. No. 12/397,362 Official Action dated Apr. 24, 2012.

International Application PCT/IB2011/055155 Search Report dated Apr. 20, 2012.

Japanese Patent Application # 2008558981 Official Action dated Nov. 2, 2011.

U.S. Appl. No. 12/522,171 Official Action dated Dec. 22, 2011.

U.S. Appl. No. 12/522,172 Official Action dated Nov. 30, 2011.

Japanese Patent Application # 2008558984 Official Action dated Nov. 1, 2011.

Chinese Patent Application # 2006800038004.2 Official Action dated Nov. 24, 2011.

Japanese Patent Application # 2008535179 Official Action dated Nov. 8, 2011.

U.S. Appl. No. 13/541,775, filed Jul. 5, 2012.

U.S. Appl. No. 12/282,517 Official Action dated Jun. 12, 2012.

U.S. Appl. No. 12/522,172 Official Action dated Jun. 29, 2012.

U.S. Appl. No. 12/703,794 Official Action dated Aug. 7, 2012.

U.S. Appl. No. 12/522,176 Official Action dated Aug. 2, 2012.

JP Patent Application # 2008558984 Office Action dated Jul. 3, 2012.

Japanese Patent Application # 2011-517308 Official Action dated Dec. 5, 2012.

U.S. Appl. No. 12/844,864 Official Action dated Dec. 6, 2012.

U.S. Appl. No. 12/758,047 Official Action dated Oct. 25, 2012.

* cited by examiner

DEPTH-VARYING LIGHT FIELDS FOR THREE DIMENSIONAL SENSING

CROSS-REFERENCE TO RELATED APPLICATIONS

This application is a division of U.S. patent application Ser. No. 11/724,068, which claims the benefit of U.S. Provisional Patent Application 60/785,187, filed Mar. 24, 2006, and of U.S. Provisional Patent Application 60/852,436, filed Oct. 16, 2006, and which is a continuation-in-part of PCT Patent Application PCT/IL2006/000335, filed Mar. 14, 2006, which claims the benefit of U.S. Provisional Patent Application 60/724,903, filed Oct. 11, 2005. All of these related applications are assigned to the assignee of the present patent application, and their disclosures are incorporated herein by reference.

FIELD OF THE INVENTION

The present invention relates generally to methods and systems for mapping of three-dimensional (3D) objects, and specifically to 3D optical ranging and mapping.

BACKGROUND OF THE INVENTION

When a coherent beam of light passes through a diffuser and is projected onto a surface, a primary speckle pattern can be observed on the surface. The primary speckle is caused by interference among different components of the diffused beam. The term "primary speckle" is used in this sense in the present patent application, in distinction to secondary speckle, which is caused by diffuse reflection of coherent light from the rough surface of an object Hart describes the use of a speckle pattern in a high-speed 3D imaging system, in Taiwanese Patent TW 527528 B and in U.S. patent application Ser. No. 09/616,606, whose disclosures are incorporated herein by reference. The system includes a single-lens camera subsystem with an active imaging element and CCD element, and a correlation processing subsystem. The active imaging element can be a rotating aperture which allows adjustable non-equilateral spacing between defocused images to achieve greater depth of field and higher sub-pixel displacement accuracy. A speckle pattern is projected onto an object, and images of the resulting pattern are acquired from multiple angles. The images are locally cross-correlated using an image correlation technique, and the surface is resolved by using relative camera position information to calculate the three-dimensional coordinates of each locally-correlated region.

Another speckle-based 3D imaging technique is described by Hunter et al., in U.S. Pat. No. 6,101,269, whose disclosure is incorporated herein by reference. A random speckle pattern is projected upon a 3D surface and is imaged by a plurality of cameras to obtain a plurality of two-dimensional digital images. The two-dimensional images are processed to obtain a three-dimensional characterization of the surface.

Other methods for 3D mapping and ranging use structured or coded illumination. For example, Sazbon et al. describe a method of this sort for range estimation in "Qualitative Real-Time Range Extraction for Preplanned Scene Partitioning Using Laser Beam Coding," *Pattern Recognition Letters* 26 (2005), pages 1772-1781, which is incorporated herein by reference. A phase-only filter codes the laser beam into M different diffraction patterns, corresponding to M different range segments in the workspace. Thus, each plane in the illuminated scene is irradiated with the pattern corresponding to the range of the plane from the light source. A common camera can be used to capture images of the scene, which may be processed to determine the ranges of objects in the scene. The authors describe an iterative procedure for designing the phase-only filter based on the Gerchberg-Saxton algorithm.

SUMMARY OF THE INVENTION

Embodiments of the present invention that are described hereinbelow provide methods and systems for 3D mapping and ranging using shaped spot illumination patterns. Such patterns comprise an array of bright spots having a controlled, identifiable shape. In some embodiments, the relative positions of the spots are uncorrelated (for example, in a random or pseudo-random pattern, such as a speckle pattern), but the spots in any case share a similar, predefined shape characteristic. In certain embodiments, the spots are elongated in a certain direction, which is common to all the spots in a given plane transverse to the illumination beam, but other spot shapes may alternatively be used.

In some embodiments, the spot shape characteristic changes with distance from the illumination source. This distance-varying shape characteristic may be achieved by passing the illumination beam through one or more optical elements that are designed to superpose two optical constraints: one to split the beam into multiple spots, and another to create the distance-varying shape. This superposition approach permits a rich variety of distance-varying patterns to be created simply and flexibly. As a result of the distance-varying shape characteristic, the shapes of the spots appearing on parts of the surface of an object that is illuminated by the pattern may be used to determine the range of those parts from the source.

In some embodiments, transverse shifts of parts of the pattern on the surface, relative to a reference pattern at a known range, are used to reconstruct a 3D map of the surface. The combination of shape-based ranging and shift-based mapping can be used to create an accurate 3D map covering a large range of distance from the illumination source.

There is therefore provided, in accordance with an embodiment of the present invention, a method for mapping, including:

projecting onto an object a pattern of multiple spots having respective positions and shapes, such that the positions of the spots in the pattern are uncorrelated, while the shapes share a common characteristic;

capturing an image of the spots on the object; and processing the image so as to derive a three-dimensional (3D) map of the object.

In one embodiment, the pattern of spots includes a random speckle pattern.

In some embodiments, the common characteristic of the shapes varies as a function of distance from a source of the pattern, and processing the image includes analyzing the characteristic of the spots on a surface of the object in the image so as to determine the distance of the surface from the source. In one embodiment, the spots share an elongate shape, which rotates as a function of distance from a source of the pattern, and analyzing the characteristic includes determining a direction of the spots on the surface of the object. Additionally or alternatively, processing the image includes finding respective offsets between the pattern on multiple areas of the object in the image and the pattern in a reference image, and using the offsets together with the distance to derive the 3D map. Finding the respective offsets may include choosing the reference image from among a plurality of reference images responsively to the distance of the surface from the source.

In another embodiment, the spots in the pattern have an elongate shape, which is aligned in a first direction, and processing the image includes finding respective offsets in a second direction, perpendicular to the first direction, between the pattern on multiple areas of the object in the image and the pattern in a reference image so as to derive the 3D map. Projecting the pattern of spots may include passing a beam of coherent light through a diffuser, wherein the beam has a profile at the diffuser that is elongated in the second direction.

In a disclosed embodiment, capturing the image includes capturing a succession of images while the object is moving, and processing the image includes tracking a movement of the object by processing the succession of the images. In one embodiment, the object is a part of a human body, and tracking the movement includes identifying a gesture made by the part of the human body and providing an input to a computer application responsively to the gesture.

There is also provided, in accordance with an embodiment of the present invention, a method for imaging, including:

defining a first optical constraint such that application of the first optical constraint to a beam of light splits the beam into a pattern of multiple spots;

defining a second optical constraint such that application of the second optical constraint to the beam of light causes the beam to form a spot having a shape characteristic that changes in a predefined manner as a function of a distance along an axis of the beam;

designing at least one optical element so as to superpose the first and second optical constraints; and directing a beam of light through the at least one optical element so as to project the pattern onto a surface such that the multiple spots in the pattern have the shape characteristic.

In some embodiments, the at least one optical element includes a first optical element for splitting the beam into the pattern and a second optical element for applying the shape characteristic. In one embodiment, the pattern includes a speckle pattern, and the first optical element includes a diffuser.

Alternatively or additionally, the at least one optical element includes a diffractive optical element (DOE). In one embodiment, the DOE includes at least one zone plate for imparting an elongate shape to the spots. The at least one zone plate may include a plurality of superposed zone plates, having different, respective periods and angular orientations so as to cause the elongate shape of the spots to rotate as a function of the distance.

Further alternatively or additionally, the at least one optical element includes a refractive optical element.

Typically, the pattern defined by the first optical constraint has a duty cycle that is no greater than ¼.

In some embodiments, the pattern defines respective positions of the spots such that the positions are uncorrelated.

In a disclosed embodiment, the second optical constraint causes the spot to have an elongate shape, which rotates as a function of the distance. In another embodiment, the second optical constraint causes the spot to have an annular shape.

In some embodiments, the method includes capturing an image of the spots on the surface, and processing the image so as to determine the distance of the surface from the at least one optical element.

There is additionally provided, in accordance with an embodiment of the present invention, apparatus for mapping, including:

an illumination assembly, which is configured to project onto an object a pattern of multiple spots having respective positions and shapes, such that the positions of the spots in the pattern are uncorrelated, while the shapes share a common characteristic;

an imaging assembly, which is configured to capture an image of the spots on the object; and an image processor, which is coupled to process the image so as to derive a three-dimensional (3D) map of the object.

There is further provided, in accordance with an embodiment of the present invention, apparatus for imaging, including:

at least one optical element, which is designed so as to superpose first and second optical constraints, such that application of the first optical constraint to a beam of light splits the beam into a pattern of multiple spots, and application of the second optical constraint to the beam of light causes the beam to form a spot having a shape characteristic that changes in a predefined manner as a function of a distance along an axis of the beam; and a light source, which is configured to direct a beam of light through the at least one optical element so as to project the pattern onto a surface such that the multiple spots in the pattern have the shape characteristic.

The present invention will be more fully understood from the following detailed description of the embodiments thereof, taken together with the drawings in which:

DETAILED DESCRIPTION OF EMBODIMENTS

System Overview

Figure 1:
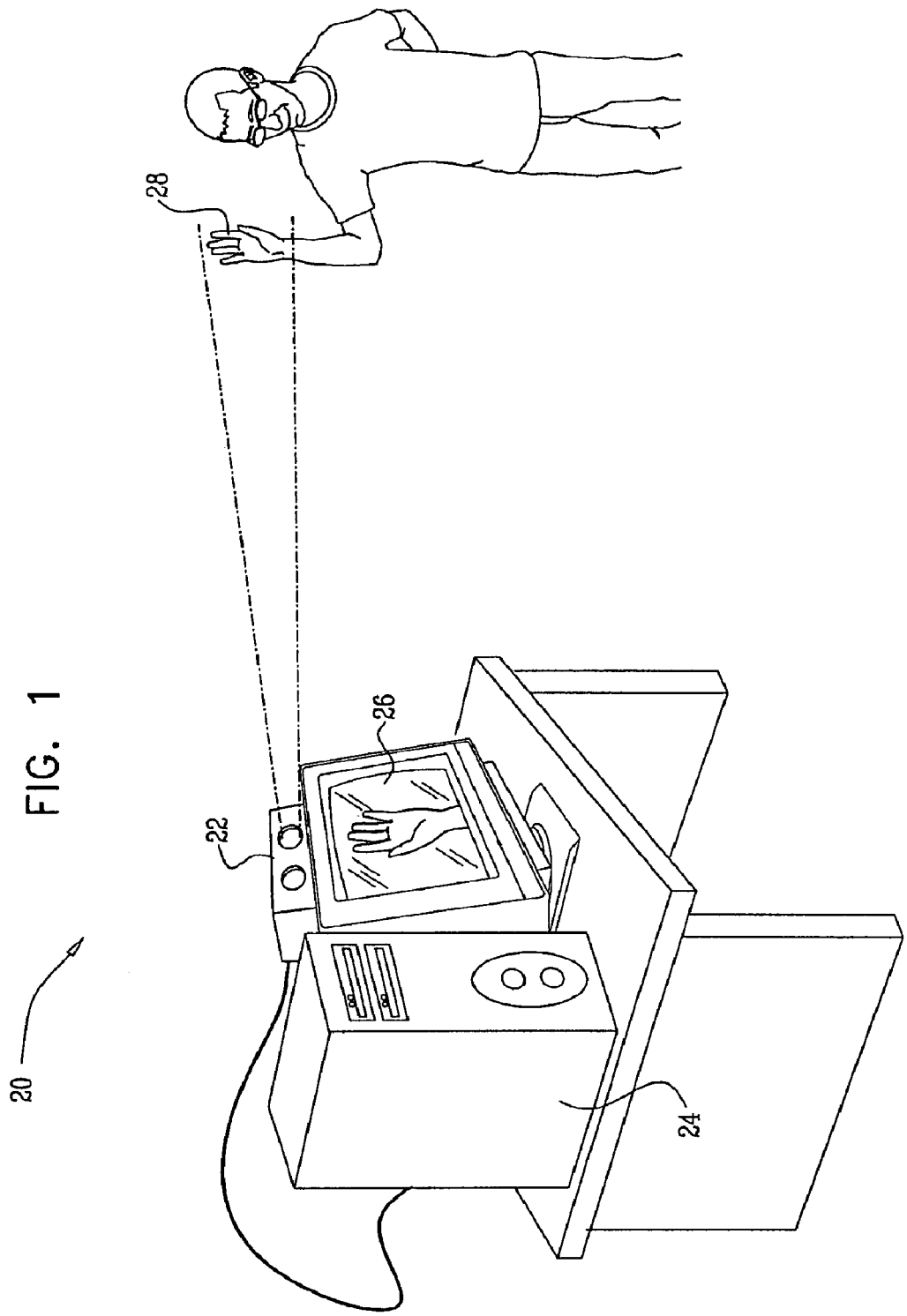
FIG. 1 is a schematic, pictorial illustration of a system for 3D ranging and mapping, in accordance with an embodiment of the present invention.

FIG. 1 is a schematic, pictorial illustration of a system 20 for 3D ranging and mapping, in accordance with, an embodiment of the present invention. System 20 comprises an imaging device 22, which generates and projects a pattern of spots onto an object 28 and captures an image of the spot pattern appearing on the object. Details of the design and operation of device 22 are shown in the figures that follow and are described hereinbelow with reference thereto.

In some embodiments, the pattern of spots that is projected by imaging device 22 comprises a speckle pattern. In the context of the present patent application and in the claims, the term "speckle pattern" refers to a projected pattern of bright spots whose positions are uncorrelated in planes transverse to the projection beam axis. The positions are uncorrelated in the sense that the auto-correlation of the positions of the speckles in the pattern as a function of transverse shift is insignificant for any shift larger than the spot size. Random patterns, such as those created by primary laser speckle (as described above), are uncorrelated in this sense. Patterns created by human or computer design, such as pseudo-random and quasi-random patterns, may also be uncorrelated. Other aspects of the theory and operation of speckle-based 3D mapping, which may be implemented in system 20, are described in PCT Patent Application PCT/IL2006/000335, filed Mar. 14, 2006, and in a PCT patent application entitled, "Three-Dimensional Sensing Using Speckle Patterns," filed Mar. 8, 2007. Both of these applications are assigned to the assignee of the present patent application, and their disclosures are incorporated herein by reference.

In other embodiments, the spots may be arranged in a regular, non-random pattern, such as the type of pattern that may be created by passing the illumination beam through a Damman grating or a suitable lenslet array.

For good performance in the ranging and mapping applications that are described below, it is advantageous that the spot pattern have a low duty cycle, i.e., that the fraction of the area of the pattern with above-average brightness be no greater than $1/e$, and desirably less than $¼$ or even $1/10$. The low duty cycle is advantageous in enhancing the signal/noise ratio of spot shift detection for 3D mapping. It also helps to avoid interference effects that may result when neighboring spots overlap.

Even when the positions of the spots (speckles) are uncorrelated, the shapes of the spots in the patterns that are used in embodiments of the present invention are not entirely random, as in conventional laser speckle patterns, but rather have a common shape characteristic. For example, in some embodiments, as described hereinbelow, the spots are elongated along a certain axis. Additionally or alternatively, the spots may have other common shape characteristics, so long as the shapes are controlled, and changes in the shapes as a function of distance along the axis of the illumination beam are identifiable. The term "changes of shape" in this context means changes other than the simple linear increase in spot size that normally occurs with distance from the illumination source.

An image processor 24 processes image data generated by device 22 in order to perform depth ranging and, optionally, 3D mapping of object 28. The term "ranging," as used in the present patent application and in the claims, refers to finding a coarse measure of distance from the imaging device to the object, while the term "3D map" refers to a set of 3D coordinates representing the surface of the object. The derivation of such a map based on image data is referred to as "3D mapping" or equivalently, "3D reconstruction." Both ranging and mapping may be used together, as coarse and fine phases, in the process of 3D reconstruction, as described hereinbelow. Therefore, ranging may also be considered to be a sort of rough 3D mapping.

Image processor 24, which performs such ranging and mapping, may comprise a general-purpose computer processor, which is programmed in software to carry out the functions described hereinbelow. The software may be downloaded to processor 24 in electronic form, over a network, for example, or it may alternatively be provided on tangible media, such as optical, magnetic, or electronic memory media. Alternatively or additionally, some or all of the functions of the image processor may be implemented in dedicated hardware, such as a custom or semi-custom integrated circuit or a programmable digital signal processor (DSP). Although processor 24 is shown in FIG. 1, by way of example, as a separate unit from imaging device 22, some or all of the processing functions of processor 24 may be performed by suitable dedicated circuitry within the housing of the imaging device or otherwise associated with the imaging device.

The 3D map that is generated by processor 24 may be used for a wide range of different purposes. For example, the map may be sent to an output device, such as a display 26, which shows a pseudo-3D image of the object. In the example shown in FIG. 1, object 28 comprises all or a part (such as a hand) of the body of a subject. In this case, system 20 may be used to provide a gesture-based user interface, in which user movements detected by means of device 22 control an interactive computer application, such as a game, in place of tactile interface elements such as a mouse, joystick or other accessory. Alternatively, system 20 may be used to create 3D maps of objects of other types, for substantially any application in which 3D coordinate profiles are needed.

Figure 2:
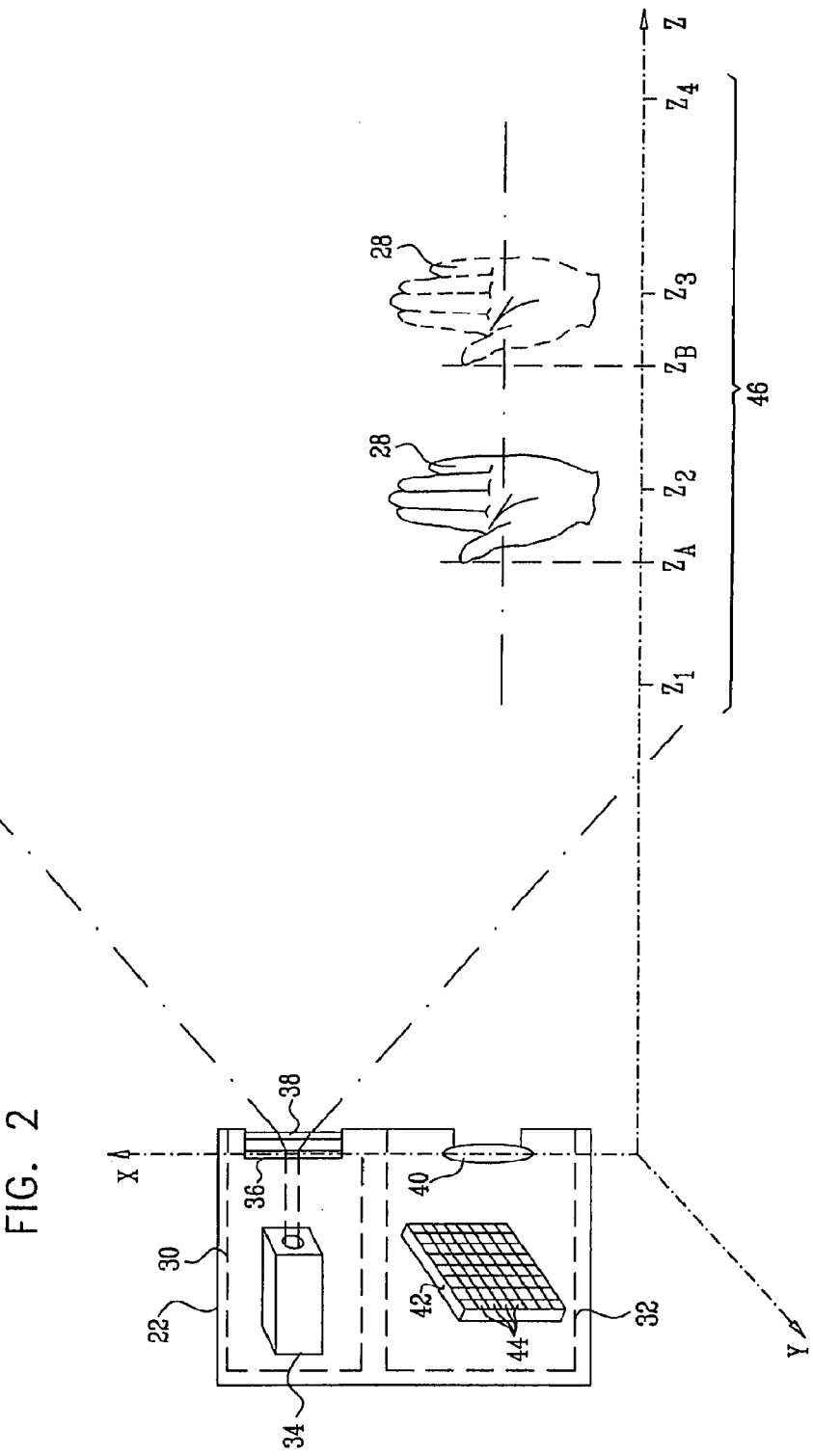
FIG. 2 is a schematic top view of a speckle imaging device, in accordance with an embodiment of the present invention.

FIG. 2 is a schematic top view of device 22, in accordance with an embodiment of the present invention. An illumination assembly 30 in device 22 comprises a coherent light source 34, typically a laser, and one or more optical elements 36, 38, which are typically used in combination to create a speckle pattern or other pattern of spots, as described hereinbelow. (The term "light" in the context of the present patent application refers to any sort of optical radiation, including infrared and ultraviolet, as well as visible light.) The beam of light emitted by source 34 passes through optical elements 36 and 38 and illuminates a target region 46 in which object 28 is located. An image capture assembly 32 captures an image of the pattern that is projected onto object 28. Assembly 32 comprises objective optics 40, which focus the image onto an image sensor 42. Typically, sensor 40 comprises a rectilinear array of detector elements 44, such as a CCD or CMOS-based image sensor array.

In the embodiment shown in FIG. 2, illumination assembly 30 and image capture assembly 32 are held in a fixed spatial relation. This configuration and the processing techniques described hereinbelow make it possible to perform 3D mapping using the single image capture assembly, without relative movement between the illumination and image capture assemblies and without moving parts. Alternatively, the techniques of illumination, ranging and mapping that are described hereinbelow may be used in conjunction with other sorts of image capture assemblies, in various different configurations, such as those described in the Background section above. For example, the image capture assembly may be movable relative to the illumination assembly. Additionally or alternatively, two or more image capture assemblies may be used to capture images of object 28 from different angles.

To simplify the computation of the 3D map and of changes in the map due to motion of object 28 in the configuration of FIG. 2, assemblies 30 and 32 may be mounted so that an axis passing through the centers of the entrance pupil of image capture assembly 32 and the spot formed by light source 34 on optical element 36 is parallel to one of the axes of sensor 40 (taken for convenience to be the X-axis, while the Z-axis corresponds to distance from device 22). The advantages of this arrangement are explained further in the above-mentioned PCT patent application entitled, "Three-Dimensional Sensing Using Speckle Patterns."

Specifically, by triangulation in this arrangement, a Z-direction shift of a point on the object, δZ, will engender a concomitant transverse shift δX in the spot pattern observed in the image. Z-coordinates of points on the object, as well as shifts in the Z-coordinates over time, may thus be determined by measuring shifts in the X-coordinates of the spots in the image captured by assembly 32 relative to a reference image taken at a known distance Z. Y-direction shifts may be disregarded. This sort of triangulation approach is appropriate particularly in 3D mapping using speckle patterns, although aspects of the approach may be adapted for use with other types of spot patterns, as well.

In other words, the group of spots in each area of the captured image is compared to the reference image to find the most closely-matching group of spots in the reference image. The relative shift between the matching groups of spots in the image gives the Z-direction shift of the area of the captured image relative to the reference image. The shift in the spot pattern may be measured using image correlation or other image matching computation methods that are known in the art. Some exemplary methods are described in the above-mentioned PCT patent applications.

Generation of Speckle Patterns with Common Shape Characteristics

Patterns of spots with a common shape characteristics can be used to enhance the operation of system 20 in a number of ways. For example, in the above-mentioned configuration of device 22, in which only X-direction shifts are significant in 3D reconstruction of the object, it may be advantageous to use a pattern of speckles that are elongated in the Y-direction. As a result, when processor 24 computes the correlation between images for the purpose of detecting Z-direction shifts, the computation will be insensitive to small shifts of the speckles in the Y-direction. This feature improves the robustness of the X-direction shift computation (and may make it possible to use a smaller correlation window in the computation).

A number of methods may be used to generate this sort of pattern of speckles, which are elongated in the Y-direction and whose positions in the X-direction are uncorrelated. One possibility is to configure optical element 36 as a diffuser, with a randomly-arranged array of grains that are elongated in the X-direction. (Element 38 may not be required in this case.) The grains may be opaque, for example, or they may alternatively be of different thickness so as to cause phase changes in the transmitted light. As another alternative, element 36 may comprise a conventional, isotropic diffuser, while the beam from light source 34 is elongated in the X-direction. A cylindrical lens (not shown) between the source and diffuser may be used for this purpose, for example.

Yet another option is that element 36 comprise a diffuser (which may be isotropic) and element 38 comprise a diffractive optical element (DOE). To generate the desired speckles with elongation along the Y-axis, element 38 may simply comprise a suitable grating or zone plate with lines oriented parallel to the X-axis.

Although elements 36 and 38 are shown in FIG. 2, for the sake of conceptual clarity, as separate components, the diffuser and DOE are typically in contact with one another and may be glued together. Alternatively, elements 36 and 38 may be made as a single piece, by forming the DOE on one side of an optical blank and grinding the other side to create the diffuser. Further alternatively, the optical constraints imposed by the diffuser and grating or zone plate may be combined in a single DOE, in which the X-oriented lines and a pseudo-random diffusing pattern are superposed, for example. In all of these cases, the pattern of speckles in the far field will be a convolution of the random position distribution provided by the diffuser with the shape defined by the Fourier transform of the DOE.

A similar superposition approach may be used in generating DOEs that create more complex patterns, which vary with distance Z. In some embodiments, the DOE may be designed to create a pattern of spots having different shapes in different distance ranges. Referring to FIG. 2, the spots may have one shape at distance $Z_1$, another at $Z_2$, and so forth. For example, the elongated shape of the spots may be rotated by 45° from range to range. As a result, when object 28 is located at $Z_A$, the spots will have the orientation of the range of $Z_2$, whereas when the object is at $Z_B$, the spots will have the orientation of the range of $Z_3$. By detecting the orientation of the spots, processor 24 (FIG. 1) may then determine the distance range of the object, independently of the 3D reconstruction process based on spot position correlation. Ranging and mapping may be used in combination to generate 3D maps with enhanced range and/or resolution, as described further hereinbelow.

Various methods may be used to design a single optical element that creates a pattern of spots with the desired Z-dependence. One method that may be used to design optical element 38 so as to give this sort of range-dependent speckle shaping is to use the iterative Gerchberg-Saxton method, as described in the above-mentioned article by Sazbon et al. The approach, however, is computationally costly and is not guaranteed to converge.

Alternatively, a set of one or more optical elements for such purposes may be designed based on a superposition of constraints. For example, such an element or elements for generating speckles with four different orientations in different, respective ranges may be produced by superposing a splitter (which generates a pattern of spots with low duty cycle and uncorrelated positions) with an element that, taken on its own, implements a single Z-varying pattern at four orientations in four predefined ranges. The element creating the single pattern may be, for instance, a superposition of four zone plates, each of which focuses light to a line in the proper, respective direction in one of the ranges.

Alternatively or additionally, the superposition may be computed and then implemented in a suitable computer-generated hologram (CGH) or other DOE. Given a set of constraints $R_i$, i=1, 2, ..., K that are to be imposed on the light intensity (or equivalently, amplitude) at distances $Z_i$, i=1, 2, ..., K, respectively, the optical elements that are to implement these constraints can be decomposed into a convolution of two patterns, $R_i = S \otimes P_i$, wherein S is the same for $R_1, R_2, ..., R_K$, while $P_i$ is allowed to vary arbitrarily with i as i=1, 2, ..., K. The constraints can be implemented using two filters $P_S$, $F_V$, corresponding to optical elements 36 and 38, as follows:

Filter $F_S$ creates intensity pattern S in the far field, meaning it is an appropriate inverse Fourier transform of S (which can be computed using techniques of DOE design that are known in the art).

Filter $F_V$ creates intensity patterns $P_i$, i=1, 2, ..., K at distances $Z_i$, i=1, 2, ..., K, respectively. Intensity patterns of this sort are generally much simpler to compute than the above-mentioned patterns $R_i$, i=1, 2, ..., K, and may generally be created individually using methods known in the art.

The combined filter $F=F_S \cdot F_V$ (wherein the multiplication is performed pointwise in the filter plane) will implement intensity patterns $R_i$, i=1, 2, ..., K at distances $Z_i$, i=1, 2, ..., K, respectively.

One shortcoming of this approach is that it is valid only for sets of constraints that can be represented as the sort of convolution $R_i = S \otimes P_i$. This shortcoming can be alleviated by using the linearity of the Fresnel-Sommerfeld equations to decompose any set of constraints into a sum of convolutions. A filter for each such convolution can then be created by the technique described above, and the filters superposed to give the desired result.

Figure 3B:
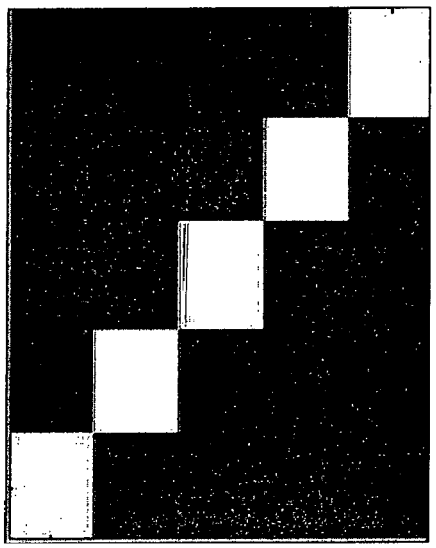
FIG. 3B is a schematic representation of a light pattern created by a diffractive optical element (DOE), in accordance with an embodiment of the present invention.
Figure 3D:
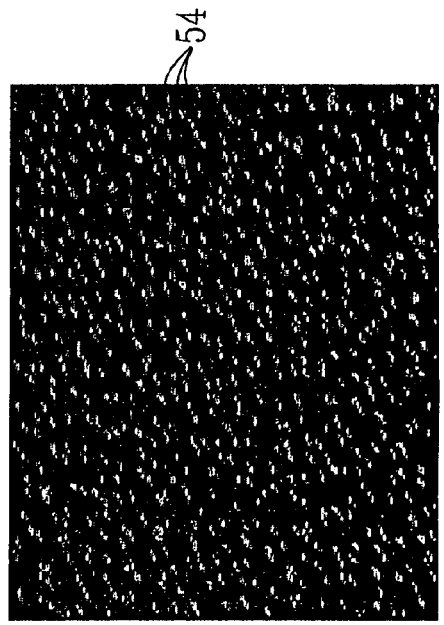
FIGS. 3C and 3D are schematic representations of speckle patterns created by projection of a laser beam through the optical elements of FIGS. 3A and 3B, in accordance with an embodiment of the present invention.
Figure 3A:
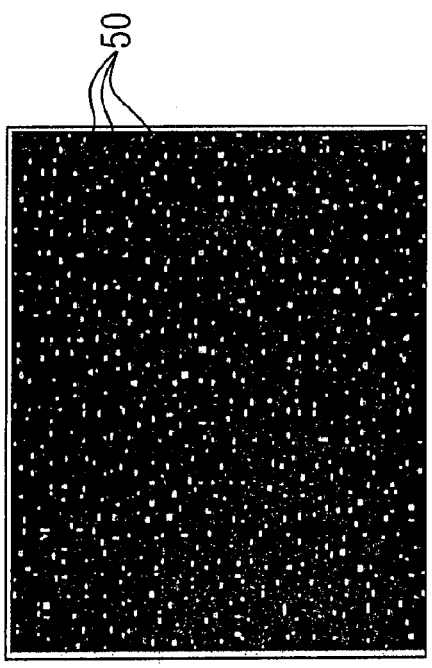
FIG. 3A is a schematic representation of a speckle pattern created by projection of a laser beam through a randomizing optical element, in accordance with an embodiment of the present invention.

FIGS. 3A-3D are schematic representations of images created by projecting a laser beam through DOEs 36 and 38 that are designed in accordance with an embodiment of the present invention. The object of this design is to create a pattern of elongated speckles whose axis of elongation varies over 180° as a function of Z over a given range from $Z_0$ to $Z_0+\Delta Z$. FIGS. 3A and 3B show the patterns created by $F_S$ and $F_V$, respectively, which are defined as follows:

$F_s$ creates a far-field pattern of random speckles, which need not vary in Z. For example, $F_S$ may be designed to create a pattern of 1000×1000 pixels, comprising 200× 200 bright speckles 50, randomly distributed, with the rest of the field dark. Depending on the sizes of the spots, the duty cycle is typically roughly between 4% and 25%. Optical element 36 to implement this pattern may comprise a phase-only DOE, created using techniques that are known in the art.

$F_v$ creates N light intensity patterns in the near-field volume between the planes $Z_0$ and $Z_0+\Delta Z$. FIG. 3B shows one such pattern at a given $$Z = Z_0 + \frac{p}{N}\Delta Z.$$

The pattern comprises V×W pixels, wherein V and W are typically small—in this case V=W=5. For each p, p=1, ..., N, the pattern is rotated by an angle θ=180*p/N relative to the vertical. Optical element 38 implementing this pattern may be designed using the Gerchberg-Saxton method described above, by superposing multiple zone plates as described below, or using any other suitable method of DOE design that is known in the art. Because the pattern is small, the computation required to generate the DOE is relatively simple in any case.

Figure 3C:
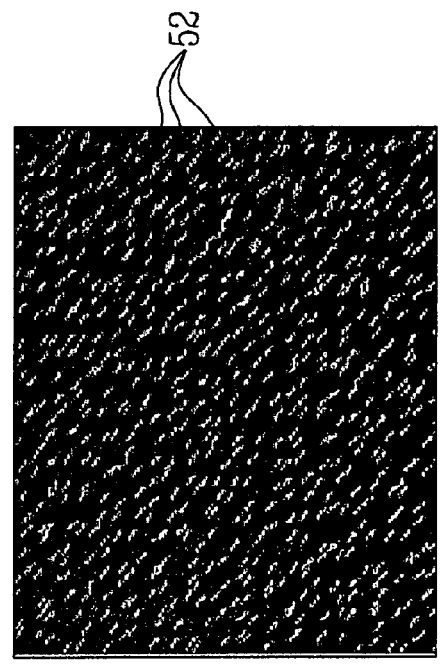

FIGS. 3C and 3D show the pattern of speckles that is created by superposing elements 36 and 38, corresponding to $F_S$ and $F_V$, at two different values of Z. The patterns comprise 200×200 elongated speckles 52 and 54, respectively, oriented at different angles depending on Z. As the distance increases from $Z_0$ to $Z_0+\Delta Z$, the speckles rotate by 180°. By detecting the angle θ of the speckles that are projected onto a surface of object 28, processor 24 is thus able to determine p=Nθ/180, giving $$Z = Z_0 + \frac{p}{N}\Delta Z$$

as the range of the surface from device 22.

Figure 4:
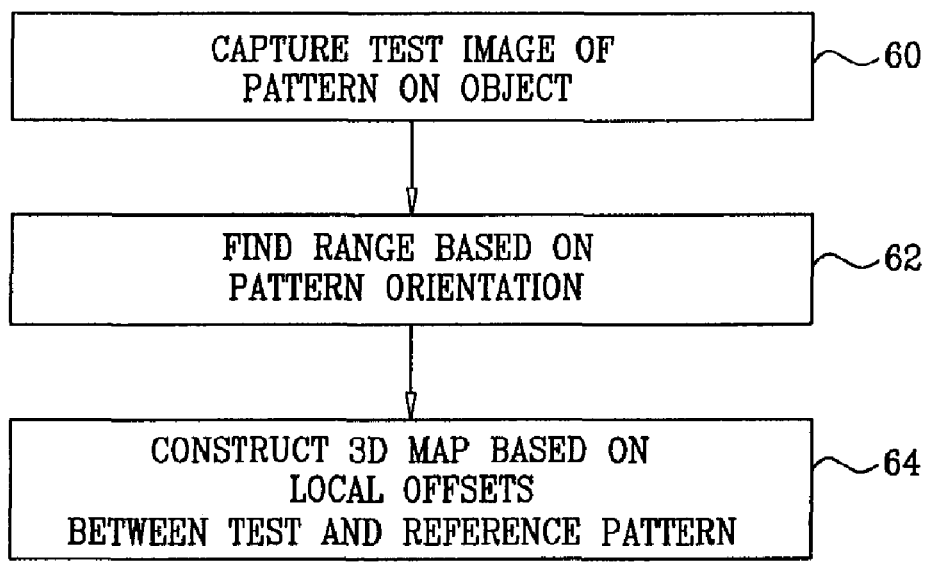
FIG. 4 is a flow chart that schematically illustrates a method for 3D ranging and mapping, in accordance with an embodiment of the present invention.

FIG. 4 is a flow chart that schematically illustrates a method for 3D ranging and mapping, in accordance with an embodiment of the present invention. The method is described hereinbelow, for the sake of clarity, with reference to system 20, as illustrated in FIGS. 1 and 2, using the speckle pattern shown in FIGS. 3C and 3D. This method may similarly be applied, however, in speckle-based imaging systems of other sorts, such as those described in the references cited above. Furthermore, other sorts of spot patterns and of Z-varying spot shape characteristics may alternatively be created and used in place of the rotating linear shape of the speckles shown in FIGS. 3C and 3D.

In preparation for ranging and imaging of an object, imaging device 22 is operated to capture one or more reference speckle images. For this purpose, for example, a planar surface may be placed at one or more known fiducial distances from the origin along the Z-axis, such as at $Z_1, Z_2, Z_3, \ldots$. Imaging assembly 32 captures a reference image of the speckle pattern that is projected onto the surface by illumination assembly 30 at each distance. Alternatively, since the speckle pattern is essentially a convolution of the small Z-varying pattern of $F_V$ and the far-field spot pattern of $F_S$, respective reference patterns can be determined separately for the two filters and then convolved to give the combined pattern at each distance Z. This approach can reduce the amount of memory required for storing the reference patterns. Further alternatively, the design of the entire pattern can be standardized, thus rendering the capture of the reference unnecessary.

Object 28 is introduced into target region 46, and device 22 captures a test image of the speckle pattern that is projected onto the surface of the object, at a test capture step 60. Processor 24 then computes the orientation angle of the speckles, at a ranging step 62. For this purpose, the processor may, for example, perform a spectral analysis of the test image. The shape of the spectrum (for example, the directions of the major and minor axes) will correspond to the orientation angle of the speckles, which will in turn indicate the range of the object. Alternatively or additionally, the processor may compute the cross-correlation between the speckle shape and a number of different reference shapes. Of course, if the object is sufficiently deep, the speckle angle may vary over the surface, so that different parts of the object will have different ranges. Processor 24 may identify the loci of any abrupt changes in speckle angle as edges of the object.

Processor 24 may use the shape-based range measurement of step 62 by itself in generating a rough 3D map of object 28. In the embodiment shown in FIG. 4, however, the processor uses this range measurement in conjunction with spot position triangulation in reconstructing the 3D map of object 28, at a reconstruction step 64. For this purpose, the processor typically measures local offsets between the speckle pattern at different points on the object surface in the test image and corresponding areas of the speckle pattern in the appropriate reference image. The processor then uses triangulation, based on the offsets, to determine the Z-coordinates of these object points. Methods that may be used for these purposes are described in the above-mentioned PCT patent applications and in the other references cited above.

The combination of ranging at step 62 with 3D reconstruction at step 64 enables system 20 to perform 3D reconstruction with greater precision and/or lower computational cost than can generally be achieved by speckle-based triangulation alone, and may also be used to increase the range in the Z-direction over which the measurement is made. For example, if multiple reference images were captured at different fiducial distances, as mentioned above, the processor can measure the local offsets relative to the reference image whose fiducial distance is closest to the range found at step 62. Even if only a single reference image is used, the triangulation accuracy and/or speed at step 64 can be enhanced since processor 24 can use the ranging result to limit the number of different local offset values that it has to check or to compute the offset with greater precision.

Steps 60-64 may be repeated continually in order to track motion of object 28 within target region 46. For this purpose, device 22 captures a succession of test images while the object is moving, and processor 24 repeats steps 62 and 64 in order to track the 3D movement of the object. It may be possible to skip step 62 in some iterations by assuming that the object has not moved too far since the previous iteration.

In an alternative embodiment (not, shown in the figures), triangulation based on shifts of the speckle pattern is used for coarse range measurement, and changes in the speckle shape characteristic are used for accurate 3D mapping. The accuracy of triangulation depends, inter alia, on the separation along the X-axis between illumination assembly 30 and image capture assembly 32. If only coarse triangulation is required, assemblies 30 and 32 can be positioned close together, thus permitting a more compact design of device 22.

Enhanced accuracy of the shape-based Z-direction measurement may be achieved, for example, by replicating the Z-varying pattern of the speckle shape over several cycles within target region 46. In other words, taking the example of the rotating linear speckle shape described above and the arrangement shown in FIG. 2, the speckle orientation may vary over 180° between $Z_1$ and $Z_2$, and then again between $Z_2$ and $Z_3$, and again between $Z_3$ and $Z_4$. Processor 24 uses the speckle triangulation result to decide in which of these three ranges object 28 is located, and then uses the speckle orientations to construct the precise 3D map of the object within this range. Alternatively, as noted earlier, other Z-varying spot shape characteristics may be used in this context in place of the directional variation illustrated in FIGS. 3C and 3D.

Various methods may be used to replicate the Z-varying shape over multiple cycles in Z. For example, the pattern may be focused onto target region 46 using a suitable multifocal lens (not shown). Such a lens may comprise, for example, a superposition of several Fresnel zone plates with different respective focal lengths. Alternatively, a suitable multifocal lens may be designed using techniques described by Ben Eliezer, et al., in "All Optical Extended Depth of Field Imaging System," *Journal of Optica and Pure Physics—A*, 5 (2003), pages S164-S169, which is incorporated herein by reference. Further alternatively, optical element 38 may be designed ab initio, using the superposition techniques described above, to give a speckle shape that repeats over multiple cycles.

Figure 5A:
FIGS. 5A-5P are schematic representations of a set of zone plates at different rotation angles, which are used in creating a DOE, in accordance with an embodiment of the present invention.
Figure 5B:
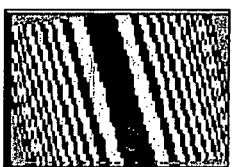
FIG. 5Q is a schematic, frontal view of a DOE created by superposing the zone plates of FIGS. 5A-5P, in accordance with an embodiment of the present invention.
Figure 5C:
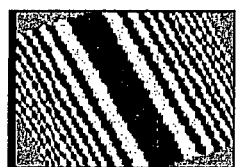
Figure 5D:
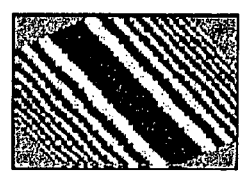
Figure 5E:
Figure 5F:
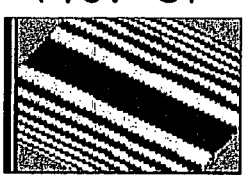
Figure 5G:
Figure 5H:
Figure 5I:
Figure 5J:
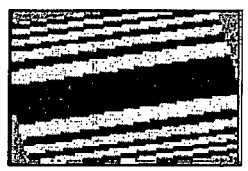
Figure 5K:
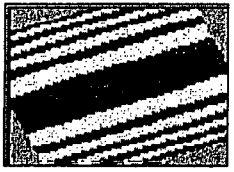
Figure 5L:
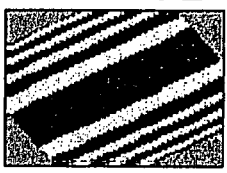
Figure 5M:
Figure 5N:
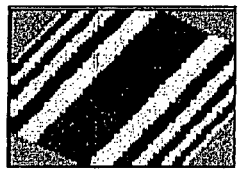
Figure 5O:
Figure 5P:
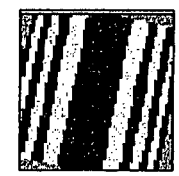
Figure 5Q:
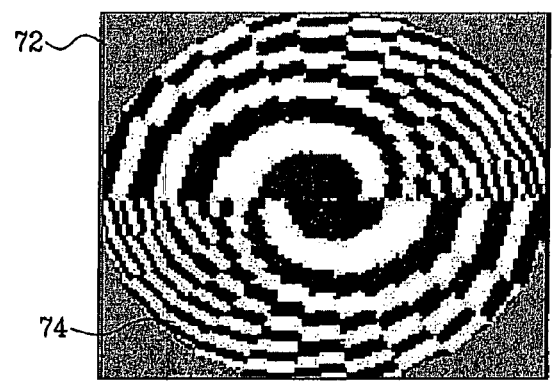

FIGS. 5A-5Q schematically illustrate a method for producing optical element 38 so as to create a pattern of shaped spots, in accordance with an embodiment of the present invention. FIGS. 5A-5P are schematic, frontal views of a set of zone plates 70, while FIG. 5Q is a schematic frontal view of a DOE 72 created by superposing the zone plates of FIGS. 5A-5P. DOE 72 can serve as the filter $F_V$, for use together with a suitable diffuser or other beam splitting filter $F_S$, in order to produce the sort of rotating, linear spots that are shown above in FIGS. 3C and 3D.

Each of zone plates 70 is a Fresnel zone plate of focal length $f_n$, n=1, . . . , N (wherein N=16 in this example), designed for wavelength λ. The transmission function of such a zone plate is given by:

$$f(x, y) = \begin{cases} 1 & \text{if } \cos\left(\frac{\pi x^2}{\lambda f}\right) > 0 \\ 0 & \text{otherwise} \end{cases}$$

wherein the X-Y axes in each zone plate are rotated by (n−1) π/N. Alternatively, zone plates 70 may be designed as transparent, phase-only zone plates. DOE 72 comprises a superposition 74 of these N zone plates. This superposition will produce a line which rotates as a function of Z at a rate of $\pi/N(f_n - f_{n-1})$rad/m.

Various methods may be used to superpose zone plates 70. For example, the superposition may be produced, as shown in FIG. 5Q, as an assemblage of "pie slices" cut from the sixteen component zone plates. Alternatively, pieces of the different zone plates may be extracted at random and assembled to create the superposition. Further alternatively, the component zone plates may be summed at each point in DOE 72 to create a single pattern, with appropriate quantization of the summed transmittance or phase shift at each point.

Alternatively, optical element 38 may comprise an array of refractive lenses instead of the zone plates described above. In this case, a superposition of cylindrical lenses (such as microlenses) at different orientations, in pie-slice or random distribution, may be used to create the desired Z-varying pattern.

FIGS. 6A-6D are schematic representations of images created by projecting a laser beam through DOEs that are designed in accordance with another embodiment of the present invention. Although the examples shown in the preceding embodiments relate specifically to patterns of speckles with rotating linear shapes, the principles of the present invention may similarly be applied in creating Z-varying patterns of other types and in optical ranging using such patterns. FIGS. 6A-6D show one example, in which speckles 80 and 82 have a common morphological characteristic, in the form of a circular or elliptical shape. The radius of the shape of each spot varies with distance from the illumination assembly at a different rate from the linear magnification of the pattern as a whole, thereby providing information on the distance. Other sorts of shapes and patterns will be apparent to those skilled in the art and are considered to be within the scope of the present invention.

Figure 6B:
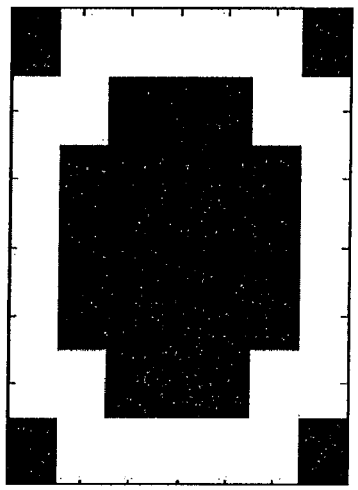
FIG. 6B is a schematic representation of a light pattern created by a diffractive optical element (DOE), in accordance with an embodiment of the present invention.
Figure 6D:
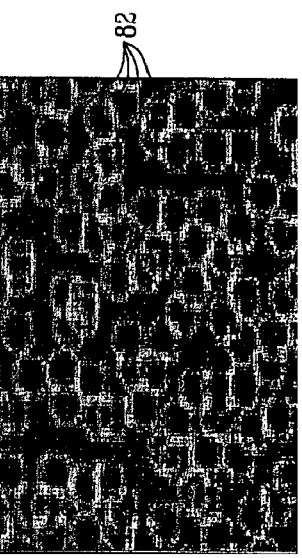
FIGS. 6C and 6D are schematic representations of speckle patterns created by projection of a laser beam through the optical elements of FIGS. 6A and 6B, in accordance with an embodiment of the present invention.
Figure 6A:
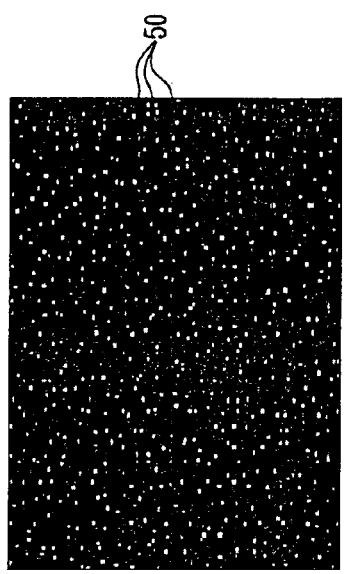
FIG. 6A is a schematic representation of a speckle pattern created by projection of a laser beam through a randomizing optical element, in accordance with an embodiment of the present invention.

FIGS. 6A and 6B show the patterns created by $F_S$ and $F_V$, respectively. As in the preceding examples, $F_s$ creates a pattern of random speckles 50, which need not vary in Z. $F_V$ creates an annular light intensity pattern in the target region. The radius of the annulus varies with Z in such a fashion as to enable ranging based on the radii of the spots that are observed in the image captured by image capture assembly 32. As explained above, an optical element implementing this pattern may be designed using the Gerchberg-Saxton method, or by superposing multiple diffractive optical elements that create simple circular or elliptical patterns with different size characteristics, or using any other suitable method of DOE design that is known in the art.

Figure 6C:
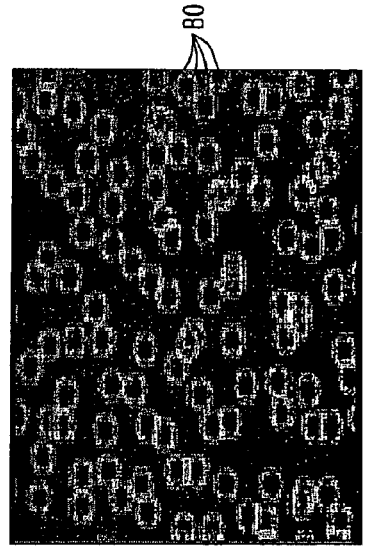

FIGS. 6C and 6D show images of the pattern of speckles that is projected onto a surface by passing coherent light through elements 36 and 38 (corresponding to $F_S$ and $F_V$), with the surface at two different values of Z. The images are shown as they would be captured by image capture assembly 32. The patterns comprise elliptical speckles 80 and 82, respectively, with different radii depending on Z. As the distance increases from $Z_0$ to $Z_0+\Delta Z$, the radii of the speckles that are projected onto the surface of object 28 and imaged onto sensor 42 increase or decrease at a known rate. By measuring the radii of the speckles, processor is thus able to determine the range of the surface from device 22. Furthermore, the processor may detect and analyze changes in the shapes of the speckles in order to determine the angular skew of the surface relative to the X-Y plane.

Although the embodiments described above relate specifically to superposition of two types of patterns, which are typically implemented using two optical elements 36 and 38, the design approach that is used in this embodiments may be extended to superposition of three or more patterns. The approach is applicable, as noted above, to a constraint i on the projected light pattern that can be presented as a convolution of L patterns $R_i = P_{1i} \otimes P_{2i} \otimes \ldots \otimes P_{Li}$. In this case, L filters $F_l$, l=1, 2, ..., L are designed such that filter $F_l$ implements patterns $P_{1i}$, i=1, 2, ..., K at $Z_i$, i=1, 2, ..., K respectively. The combined filter $$F = \prod_{l=1,2,\ldots,L} F_l$$

implements $R_i = P_{1i} \otimes P_{2i} \otimes \ldots \otimes P_{Li}$ on a Z-scale that is reduced by a factor L. Therefore, at the design stage, the filters are scaled up by a factor L. It can be shown, using general scalar diffraction theory, that the field distribution at z, U(x, y, z), will be given by $$U(x, y, z) = \bigotimes_{l=1}^{L} U_l(x, y, z),$$

wherein $U_l(x, y, z)$ is the pattern filter l would create at distance z, and $$\bigotimes_{l=1}^{L}$$

denotes convolution.

Furthermore, although the embodiments described above relate to specifically to speckle shaping and speckle-based 3D ranging and mapping, the methods described above for designing multi-constraint filters and other optical elements—and particularly elements that create Z-varying patterns—may also be used to create optical elements in other applications in which complex light patterns are needed.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for mapping, comprising:
projecting onto an object a pattern of multiple spots having respective positions and shapes, such that the positions of the spots in the pattern are uncorrelated, while the shapes share a common characteristic, which varies as a function of distance from a source of the pattern;
capturing an image of the spots on the object; and
processing the image so as to derive a three-dimensional (3D) map of the object by analyzing both the respective positions of the spots and the characteristic of the shapes of the spots on a surface of the object in the image.

2. The method according to claim 1, wherein the pattern of spots comprises a random speckle pattern.

3. The method according to claim 1, wherein projecting the pattern comprises passing a beam of coherent light through at least one optical element, which is designed to superpose a first optical constraint that splits the beam into the multiple spots, and a second optical constraint for applying the common characteristic of the shapes to at least one spot.

4. The method according to claim 3, wherein the at least one optical element comprises a first optical element for creating the pattern and a second optical element for applying the common characteristic.

5. The method according to claim 1, wherein the spots share an elongate shape, which rotates as a function of distance from a source of the pattern, and wherein analyzing the characteristic comprises determining a direction of the spots on the surface of the object.

6. The method according to claim 1, wherein processing the image comprises analyzing the characteristic of the spots on a surface of the object in the image so as to determine the distance of the surface from the source, and finding respective offsets between the pattern on multiple areas of the object in the image and the pattern in a reference image, and using the offsets together with the distance to derive the 3D map.

7. The method according to claim 6, wherein finding the respective offsets comprises choosing the reference image from among a plurality of reference images responsively to the distance of the surface from the source.

8. The method according to claim 1, wherein the spots in the pattern have an elongate shape, which is aligned in a first direction, and wherein processing the image comprises finding respective offsets in a second direction, perpendicular to the first direction, between the pattern on multiple areas of the object in the image and the pattern in a reference image so as to derive the 3D map.

9. The method according to claim 8, wherein projecting the pattern of spots comprises passing a beam of coherent light through a diffuser, wherein the beam has a profile at the diffuser that is elongated in the second direction.

10. The method according to claim 1, wherein capturing the image comprises capturing a succession of images while the object is moving, and wherein processing the image comprises tracking a movement of the object by processing the succession of the images.

11. The method according to claim 10, wherein the object is a part of a human body, and wherein tracking the movement comprises identifying a gesture made by the part of the human body and providing an input to a computer application responsively to the gesture.

12. Apparatus for mapping, comprising:
an illumination assembly, which is configured to project onto an object a pattern of multiple spots having respective positions and shapes, such that the positions of the spots in the pattern are uncorrelated, while the shapes share a common characteristic, which varies as a function of distance from a source of the pattern;

an imaging assembly, which is configured to capture an image of the spots on the object; and an image processor, which is coupled to process the image so as to derive a three-dimensional (3D) map of the object by analyzing both the respective positions of the spots and the characteristic of the shapes of the spots on a surface of the object in the image.

13. The apparatus according to claim 12, wherein the pattern of spots comprises a random speckle pattern.

14. The apparatus according to claim 12, wherein the illumination assembly comprises:

at least one optical element, which is designed to superpose a first optical constraint that splits the beam into the multiple spots, and a second optical constraint for applying the common characteristic of the shapes to at least one spot; and a light source, which is configured to direct a beam of coherent light through the at least one optical element.

15. The apparatus according to claim 14, wherein the at least one optical element comprises a first optical element for creating the pattern and a second optical element for applying the common characteristic to the shapes.

16. The apparatus according to claim 12, wherein the spots share an elongate shape, which rotates as a function of distance from a source of the pattern, and wherein the image processor is configured to determine a direction of the spots on the surface of the object.

17. The apparatus according to claim 12, wherein the image processor is configured to analyze the characteristic of the spots on a surface of the object in the image so as to determine the distance of the surface from the source, and to find respective offsets between the pattern on multiple areas of the object in the image and the pattern in a reference image, and to use the offsets together with the distance to derive the 3D map.

18. The apparatus according to claim 17, wherein the image processor is configured to choose the reference image from among a plurality of reference images responsively to the distance of the surface from the source.

19. The apparatus according to claim 12, wherein the spots in the pattern have an elongate shape, which is aligned in a first direction, and wherein the image processor is configured to find respective offsets in a second direction, perpendicular to the first direction, between the pattern on multiple areas of the object in the image and the pattern in a reference image so as to derive the 3D map.

20. The apparatus according to claim 19, wherein the illumination assembly comprises a diffuser and a light source, which is configured to direct a beam of coherent light through the diffuser, wherein the beam has a profile at the diffuser that is elongated in the second direction.

21. The apparatus according to claim 12, wherein the imaging assembly is configured to capture a succession of images while the object is moving, and wherein the image processor is configured to track a movement of the object by processing the succession of the images.

22. The apparatus according to claim 21, wherein the object is a part of a human body, and wherein the image processor is configured to identify a gesture made by the part of the human body and to provide an input to a computer application responsively to the gesture.

* * * * *